US012000300B2

(12) United States Patent
Joret et al.

(10) Patent No.: US 12,000,300 B2
(45) Date of Patent: Jun. 4, 2024

(54) EXHAUST CONE FOR A TURBOMACHINE

(71) Applicant: SAFRAN NACELLES, Gonfreville-l'Orcher (FR)

(72) Inventors: Jean-Philippe Joret, Moissy-Cramayel (FR); Vincent Devanlay, Moissy-Cramayel (FR); Marine Ollivier, Moissy-Cramayel (FR); Guillaume Levieux, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/034,659

(22) PCT Filed: Nov. 3, 2021

(86) PCT No.: PCT/FR2021/051936
§ 371 (c)(1),
(2) Date: Apr. 28, 2023

(87) PCT Pub. No.: WO2022/096822
PCT Pub. Date: May 12, 2022

(65) Prior Publication Data
US 2023/0392518 A1    Dec. 7, 2023

(30) Foreign Application Priority Data
Nov. 5, 2020   (FR) ........................................ 2011383

(51) Int. Cl.
*F01D 25/24*   (2006.01)
(52) U.S. Cl.
CPC .......... *F01D 25/24* (2013.01); *F05D 2260/30* (2013.01)

(58) Field of Classification Search
CPC ................. F01D 25/24; F05D 2260/30; F05D 2300/6033; F02K 1/80; F02K 1/805; F02K 1/04; Y02T 50/60
See application file for complete search history.

(56) References Cited

U.S. PATENT DOCUMENTS 8,141,370 B2 * 3/2012 Bulman .................. F23R 3/007
                                                    60/752
11,300,075 B2 * 4/2022 Alloway ................. F01D 25/30
(Continued)

FOREIGN PATENT DOCUMENTS

FR          2949820 A1      3/2011
FR          2978989 A1 *    2/2013   ............... F02K 1/04
(Continued)

OTHER PUBLICATIONS

International Patent Application No. PCT/FR2021/051936 English translation of International Search Report dated Feb. 23, 2022, 2 pages.

*Primary Examiner* — David E Sosnowski
*Assistant Examiner* — Ayne A Lambert
(74) *Attorney, Agent, or Firm* — Cozen O'Connor

(57) ABSTRACT

The invention relates to an assembly for a turbomachine, comprising an exhaust cone (18) and an exhaust case having an annular inner shell, the exhaust cone (18) and the exhaust case extending about an axis (X), the exhaust cone (18) having a radially outer skin (31) extending in the projection of said inner shell and a radially inner skin (30) defining a chamber (32) with the outer skin (31), the upstream end (33) of the cone (18) being fastened to the inner shell (19) via connecting lugs (39), the assembly comprising an annular fairing (29) located radially outside said lugs (39) and extending axially between the inner shell (19) of the exhaust case (17) and the outer skin (31) of the exhaust cone (18), said fairing (29) extending in the projection of said inner (Continued)

shell (19) and of the outer skin (31), the assembly being characterized in that the fairing (29) is segmented and consists of multiple angular segments (42) arranged circumferentially end to end.

12 Claims, 13 Drawing Sheets

(56) References Cited

U.S. PATENT DOCUMENTS

| | | | | |
|---|---|---|---|---|
| 2010/0205930 A1* | 8/2010 | Conete | ............ | F02K 1/04 |
| | | | | 29/889.22 |
| 2012/0160933 A1* | 6/2012 | Vauchel | ............ | F02K 1/827 |
| | | | | 239/265.11 |
| 2014/0241863 A1* | 8/2014 | Tardif | ............ | F02K 1/80 |
| | | | | 415/145 |
| 2018/0066605 A1* | 3/2018 | Todorovic | ............ | F02K 1/80 |
| 2019/0162079 A1* | 5/2019 | Bertandeau | ............ | B64D 33/04 |

FOREIGN PATENT DOCUMENTS

| | | | | |
|---|---|---|---|---|
| FR | 2987079 A1 | | 8/2013 | |
| FR | 3084916 A1 | | 2/2020 | |
| FR | 3084917 A1 | | 2/2020 | |
| FR | 3095476 A1 * | | 10/2020 | ............ F02K 1/44 |

* cited by examiner

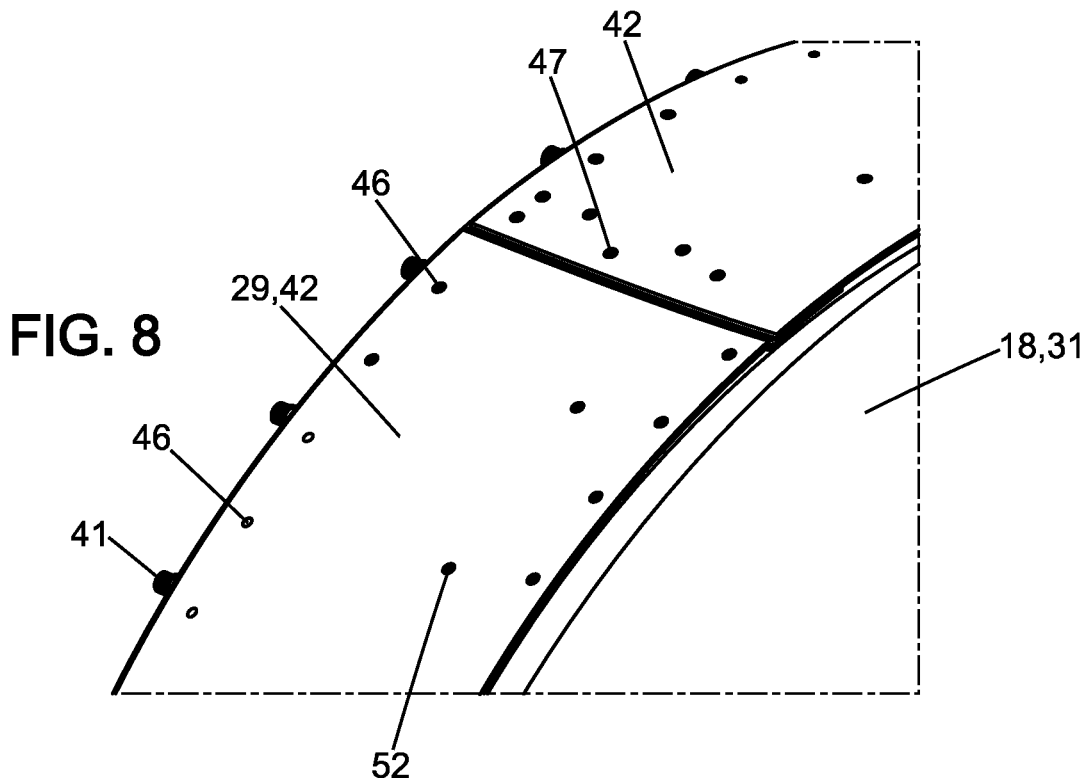
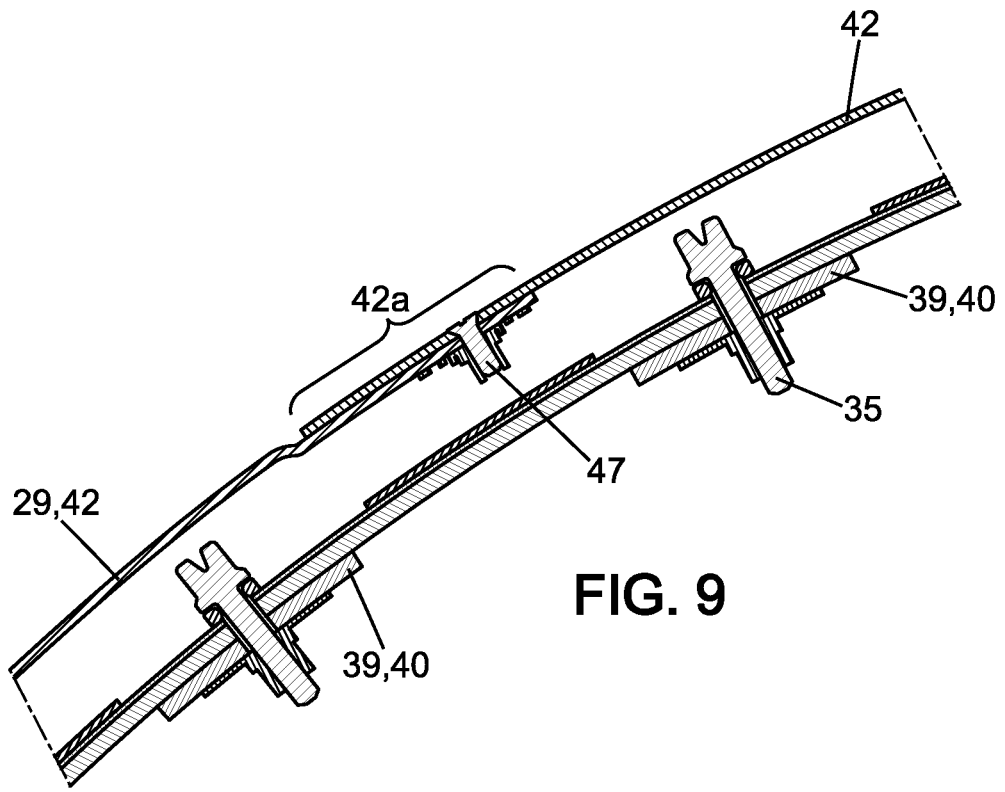

EXHAUST CONE FOR A TURBOMACHINE

CROSS-REFERENCE TO RELATED APPLICATIONS

This application is a US National phase Application of International Patent Application No. PCT/FR2021/051936 filed Nov. 3, 2021, which claims priority to FR No. 2011383 filed Nov. 3, 2020, titled "Assembly for a Turbomachine," both of which are hereby incorporated in their entireties.

TECHNICAL FIELD OF THE INVENTION

The invention relates to an assembly for a turbomachine, in particular an exhaust cone for a turbojet engine or an aircraft turboprop engine.

PRIOR ART

A propulsion assembly for an aircraft, also known as integrated propulsion system, conventionally includes a turbomachine, for example a turbojet engine, a nacelle and a mast or coupling pylon intended to enable the coupling of the propulsion assembly on a structural portion, for example under the wing, of the aircraft.

The turbomachine is for example a turbofan engine. Such a turbomachine 1, illustrated in FIG. 1, has an axis X and includes from upstream to downstream in the direction of gas flow inside the turbomachine, a fan 2, a low-pressure compressor 3, a high-pressure compressor 4, a combustion chamber 5, a high-pressure turbine 6 and a low-pressure turbine 7.

Hereinafter in the description, the terms upstream and downstream are defined in relation to the direction of gas flow inside the turbomachine.

Moreover, the terms axial, radial and circumferential are defined in relation to the axis X of the turbomachine.

The air F entering at the fan is divided into a primary air flow F1 flowing through a so-called primary path 8 and into a secondary air flow F2 flowing through a so-called secondary path 9, surrounding the primary path 8. The low- and high-pressure compressors 3, 4, the combustion chamber 5 and the high- and low-pressure turbines 6, 7 are located at the primary path 8.

The high-pressure turbine 6 drives the high-pressure compressor 4 via a so-called high-pressure shaft. The low-pressure turbine 7 drives the low-pressure compressor 3 and the fan 2, via a so-called low-pressure shaft and optionally via a reduction gear in the case where the rotational speed of the fan 2 is lower than the rotational speed of the low-pressure compressor 3.

The majority of the thrust generated by the turbomachine 1 is produced by the secondary flow F2, downstream from the fan 2.

The fan 2 is surrounded by a fan case 10, a so-called intermediate case 11 being located downstream from the fan case 10. The intermediate case 11 includes a radially outer shell 12 located in the projection of the fan case 10 and a so-called inter-path portion 13, located between the primary path 8 and secondary path 9. The inter-path portion 13 includes a separating spout 14 at the upstream end thereof and is connected to the outer shell 12 by so-called structural arms 15.

The turbomachine 1 furthermore includes a central case 16, located downstream from the inter-path portion 13 of the intermediate case 11, and an exhaust case 17, located downstream from the central case 16 and on which an exhaust cone 18 is mounted. The exhaust case 17 includes a radially inner shell 19 and a radially outer shell 20, connected by radially extending blades. The inner 19 and outer shells 20 of the exhaust case 17 define the downstream end of the primary path 8 between them.

As illustrated in FIG. 2, the nacelle 21 of the propulsion assembly conventionally includes a fan nacelle 22, surrounding the fan 2 as well as the fan case 10 and the outer shell 12 of the intermediate case 11. The fan nacelle 22 forms an air inlet lip 23 at the upstream end thereof.

The nacelle 21 furthermore includes a motor nacelle 24 surrounding the zones of the turbomachine 1 including the high-pressure compressor 4, the combustion chamber 5, the high-pressure turbine 6, and the low-pressure turbine 7 in particular.

As illustrated in FIG. 3 and known from the document FR 3 084 916 held by the Applicant, the upstream end of the exhaust cone 18 is connected to the downstream end of the inner shell 19 of the exhaust case 17 via an annular connection flange 25 (also seen in FIG. 4).

The cone 18 is generally made of ceramic matrix composite material, also known as the acronym CMC. The cone 18 can in particular include a radially outer skin and a radially inner skin defining therebetween an acoustic chamber wherein an internal acoustic structure 26 is housed. The inner shell 19 of the exhaust case 18 is metallic, for example made of titanium alloy.

The flange 25 is metallic, for example made of titanium alloy, and includes an annular portion 27 of axis X, from which flexible lugs 28 extend. The lugs 28 are regularly distributed along the circumference.

Such soft or flexible lugs 28 make it possible to compensate for differential expansion phenomena occurring between the inner shell 19 of the exhaust case 17 and the cone 18, these two elements 17, 18 being made of different materials.

An annular fairing 29 formed of one piece can surround the lugs and extend in the projection of the inner shell 19 and the outer skin of the cone 18.

Exhaust assembly refers to the assembly formed by the exhaust case 17, the exhaust cone 18, the flange 25 and the fairing 29. According to the configurations, such an assembly is generally assembled and/or disassembled via the downstream and via the internal volume of said assembly, the aforementioned volume optionally being of small size.

PRESENTATION OF THE INVENTION

The invention aims to remedy this drawback, in a simple, reliable and inexpensive manner. To this end, the invention relates to an assembly for a turbomachine, including an exhaust cone and an exhaust case including an annular inner shell, the exhaust cone and the exhaust case extending about an axis, the exhaust cone including a radially outer skin extending in the projection of said inner shell and a radially inner skin defining a chamber with the outer skin, the upstream end of the cone being fastened to the inner shell via connecting lugs, the assembly including an annular fairing located radially outside said lugs and extending axially between the inner shell of the exhaust case and the outer skin of the exhaust cone, said fairing extending in the projection of said inner shell and of the outer skin, characterized in that the fairing is segmented and consists of several angular segments arranged circumferentially end to end.

The terms upstream and downstream are defined in relation to the direction of gas flow inside the turbomachine. The terms axial, radial and circumferential are defined in relation to the axis of the cone and of the exhaust case, which is merged with the axis of the turbomachine.

The use of several angular segments for the embodiment of the fairing makes it possible to facilitate assembling and disassembling the assembly.

The chamber can be an acoustic chamber, i.e., particularly having the function of attenuating noise.

The connecting lugs can be flexible or elastically deformable.

The number of angular segments can be between 2 and 16 and is for example equal to 4.

The fairing can include an upstream end fastened to the inner shell of the exhaust case or to a flange fastened to said inner shell, and an opposite downstream zone supported by a support member, said support member extending radially between said downstream zone of the fairing and the cone.

More specifically, the support member can be arranged radially between the fairing and the outer skin of the cone.

The support member can be radially deformable.

Several support members can be arranged radially between the fairing and the cone. The support members can be regularly distributed along the circumference.

Each support member can include a radially inner planar portion, fastened to the upstream end of the cone, in particular at the upstream end of the outer skin, a radially outer planar portion, fastened to the fairing, and a median planar portion extending radially between the inner and outer portions. The inner portion and/or the outer portion can be fastened by welding, riveting or bolting to the fairing or to the cone. The median portion of each support member can extend obliquely in relation to the radial direction. The support member can have a general Z shape.

The assembly can include an annular seal extending radially between the downstream end of the fairing and the cone.

Such a seal prevents a gas leak flow from the primary path entering the volume located radially inside the fairing.

The seal can extend in particular between said downstream end of the fairing and the outer skin of the cone.

The seal can be deformable in the radial direction.

The seal can include a fastening portion to the fairing or to the cone, and a median portion in sheet form, extending obliquely in relation to the radial direction.

The annular median portion is thus conical.

Said median portion can include a series of adjacent fingers, the fingers being elastically deformable individually in relation to each other.

The seal can include a rounded end pressing on the cone or the fairing, directly or via a pressing element fastened to said cone or said fairing. Such a rounded end makes it possible to create tight linear pressing with the surface of the cone or of the fairing whereon it presses.

Said median portion can extend from downstream to upstream and radially from the outside inward.

Said median portion can extend from upstream to downstream and radially from the outside inward.

According to the radially outer or radially inner portion of the fastening portion of the seal and the orientation of the inclination of the median portion of the seal, the embodiment is used when the pressure in the secondary path is greater or less than the pressure radially inside the fairing, so as to press the free radial end of the seal on the fairing or the cone due to the difference in pressure on one side and the other of the median portion of the seal.

The seal can include a zone of hollow rounded cross-section.

Such a seal can include a widened base fastened to the fairing or to the cone, in particular to the outer skin of the cone, the zone of hollow rounded cross-section extending from the base. Circumferential ends to two adjacent fairing segments can overlap circumferentially.

Such an overlap makes it possible to limit the leak flow rate radially inward from the primary path.

The overlap zone can extend over a range between 10 and 100 mm, for example. The fairing segments can be fastened to one another at the overlap zone, for example via removable fastening means. The removable fastening means include for example bolts.

The adjacent angular segments can be fastened to one another and/or fastened to the inner shell of the exhaust case via removable fastening means.

The removable fastening means include for example bolts.

Such removable means make it possible to be able to disassemble the fairing easily.

The upstream end of the fairing can be fastened to the inner shell of the exhaust case via an annular connecting rail. The rail can have a general L shape, including a radial annular portion fastened to the inner shell of the exhaust case, and an annular axial portion for fastening the upstream end of the fairing.

The assembly can include an annular flange connecting the inner shell of the exhaust case to the cone, the flange including said flexible connecting lugs.

The flange includes an annular portion fastened to the inner shell of the exhaust case, the connecting lugs extending axially from the annular portion. The annular portion can optionally be integral with the lugs. The lugs can be planar and can each extend along an axis parallel with the axis of the cone and the exhaust case.

The flange can be segmented and can consist of several angular segments arranged circumferentially or end to end, each flange segment including at least one lug extending in a rectilinear manner along an axis parallel with the axis of the cone.

The assembly can include sealing members mounted circumferentially between the lugs. Said members can be formed by sheets or foils mounted between the lugs.

A cellular material, for example honeycombed, can be mounted in the acoustic chamber.

The fairing can be metallic, for example made of nickel- or titanium-based alloy, for example of Inconel. The cone can be made, wholly or partially, of ceramic matrix composite material, also known as the acronym CMC. The exhaust case can be metallic, for example made of nickel- or titanium-based alloy.

The mounting of such an assembly can include one or more of the steps consisting of:
- mounting the annular connecting rail and/or the flange onto the exhaust case,
- mounting the subassembly formed by the inner skin, the outer skin and/or an acoustic material contained in the acoustic chamber, on the flexible flange,
- mounting the angular segments of the fairing.

The invention also relates to a turbomachine including at least one assembly of the aforementioned type.

BRIEF DESCRIPTION OF THE FIGURES

FIG. 8 is a perspective view illustrating the fairing segments, FIG. 9 is a radial sectional view of a portion of the assembly.

DETAILED DESCRIPTION OF THE INVENTION

Figure 1:
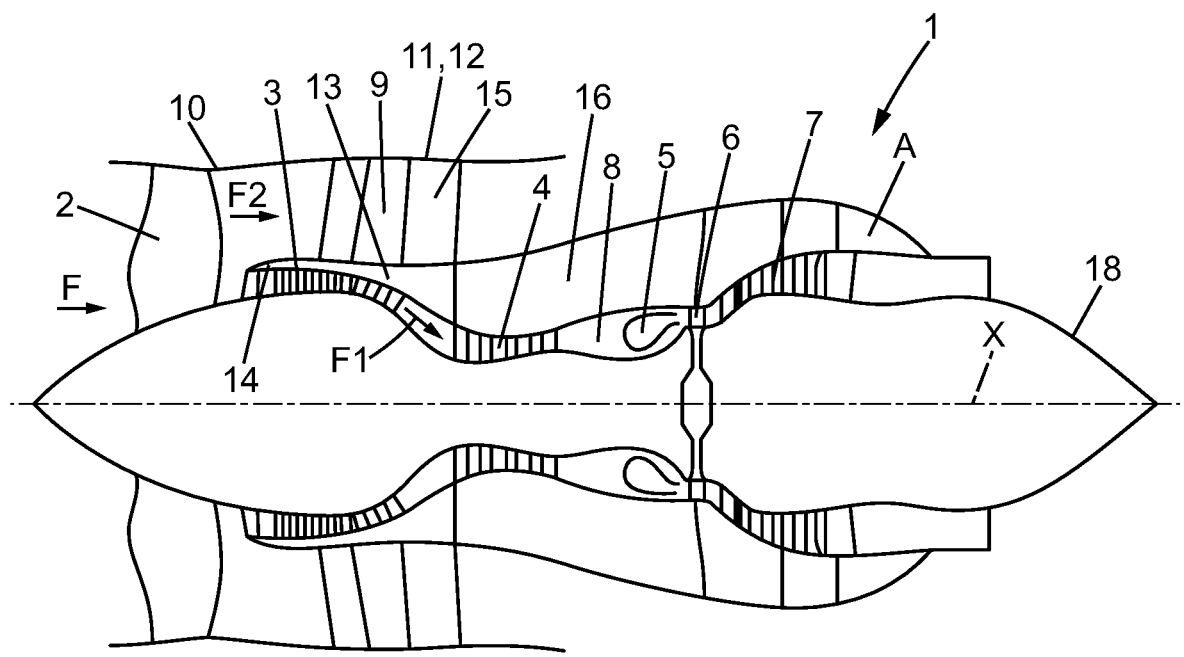
FIG. 1 is a schematic axial sectional view of a turbomachine of the prior art.
Figure 2:
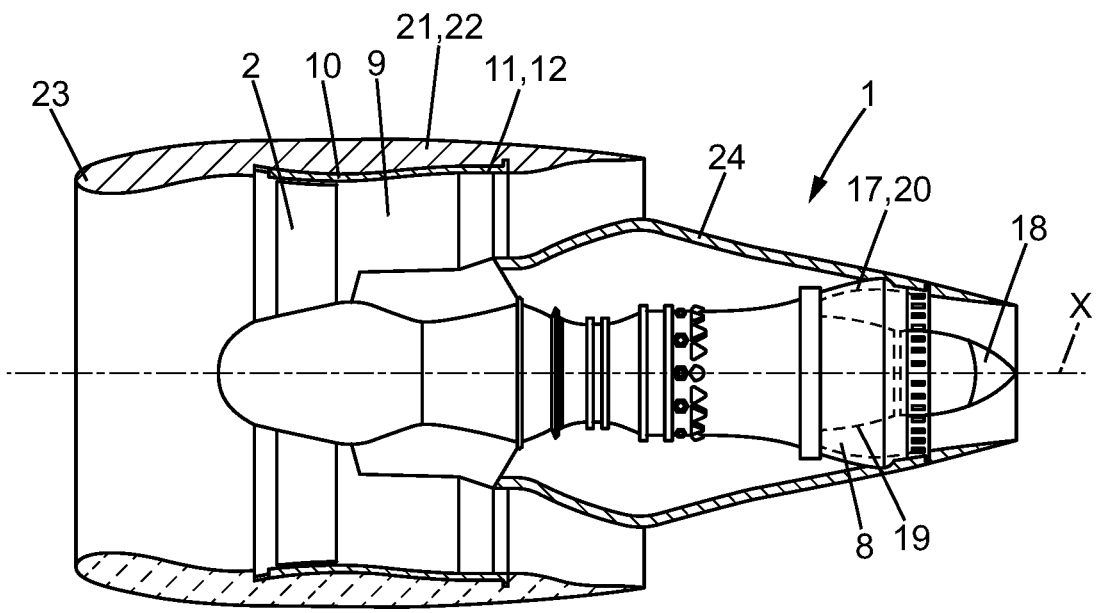
FIG. 2 is a schematic axial sectional view of a propulsion assembly of the prior art.
Figure 3:
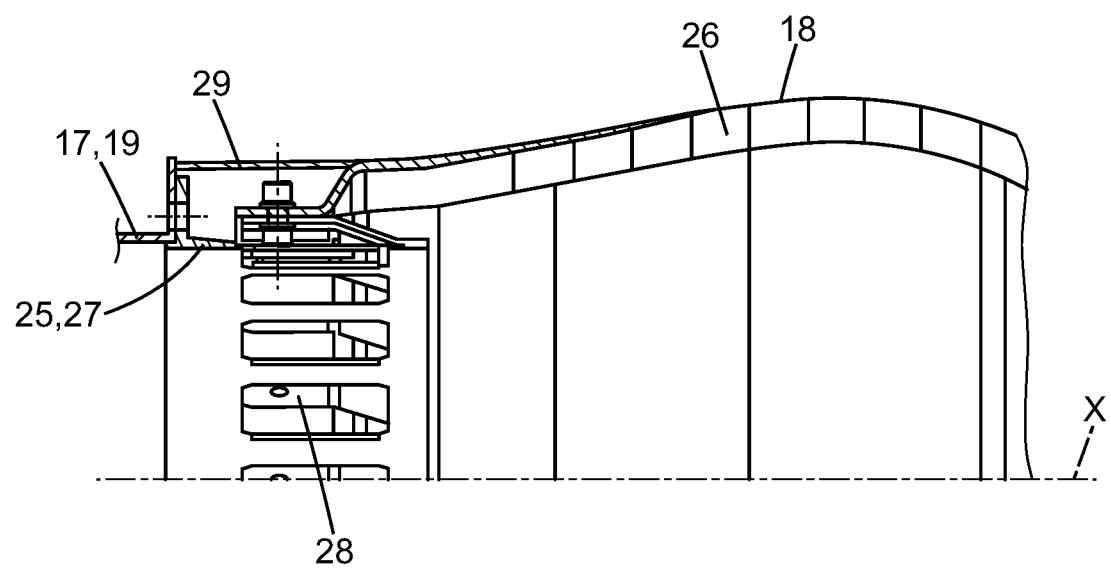
FIG. 3 is an axial sectional half-view of a portion of a turbomachine exhaust assembly of the prior art.
Figure 4:
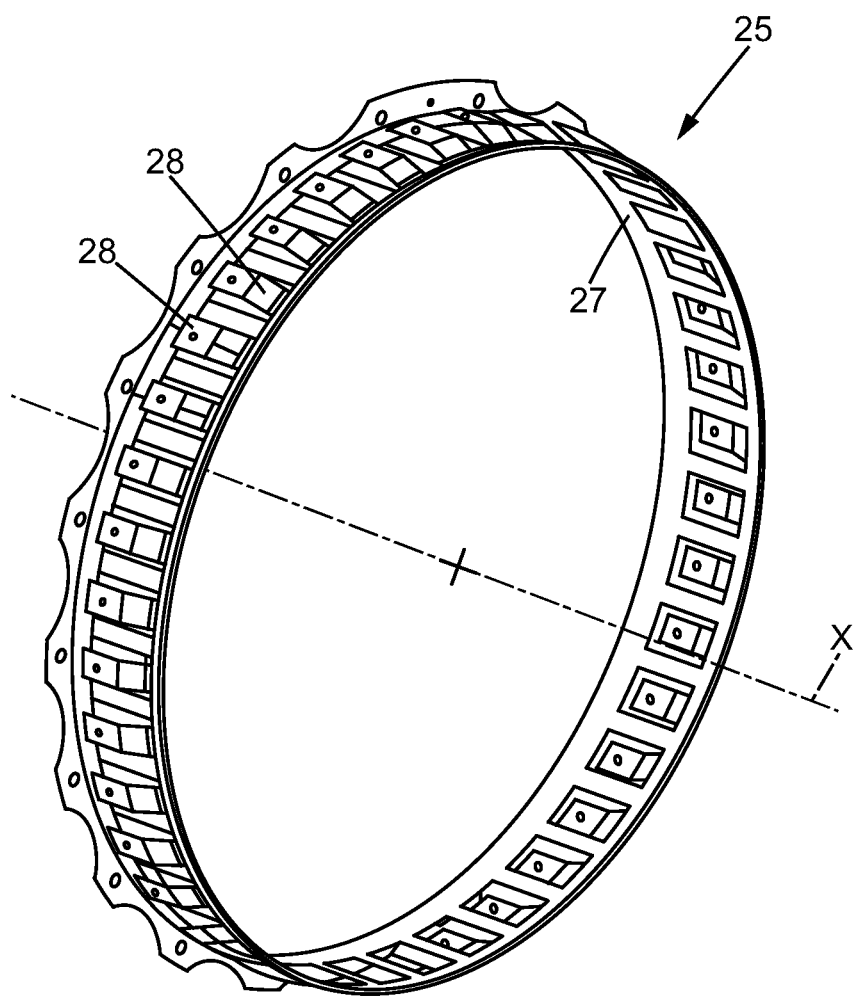
FIG. 4 is a perspective view of a connecting flange between an exhaust cone and an exhaust case, according to the prior art.
Figure 5:
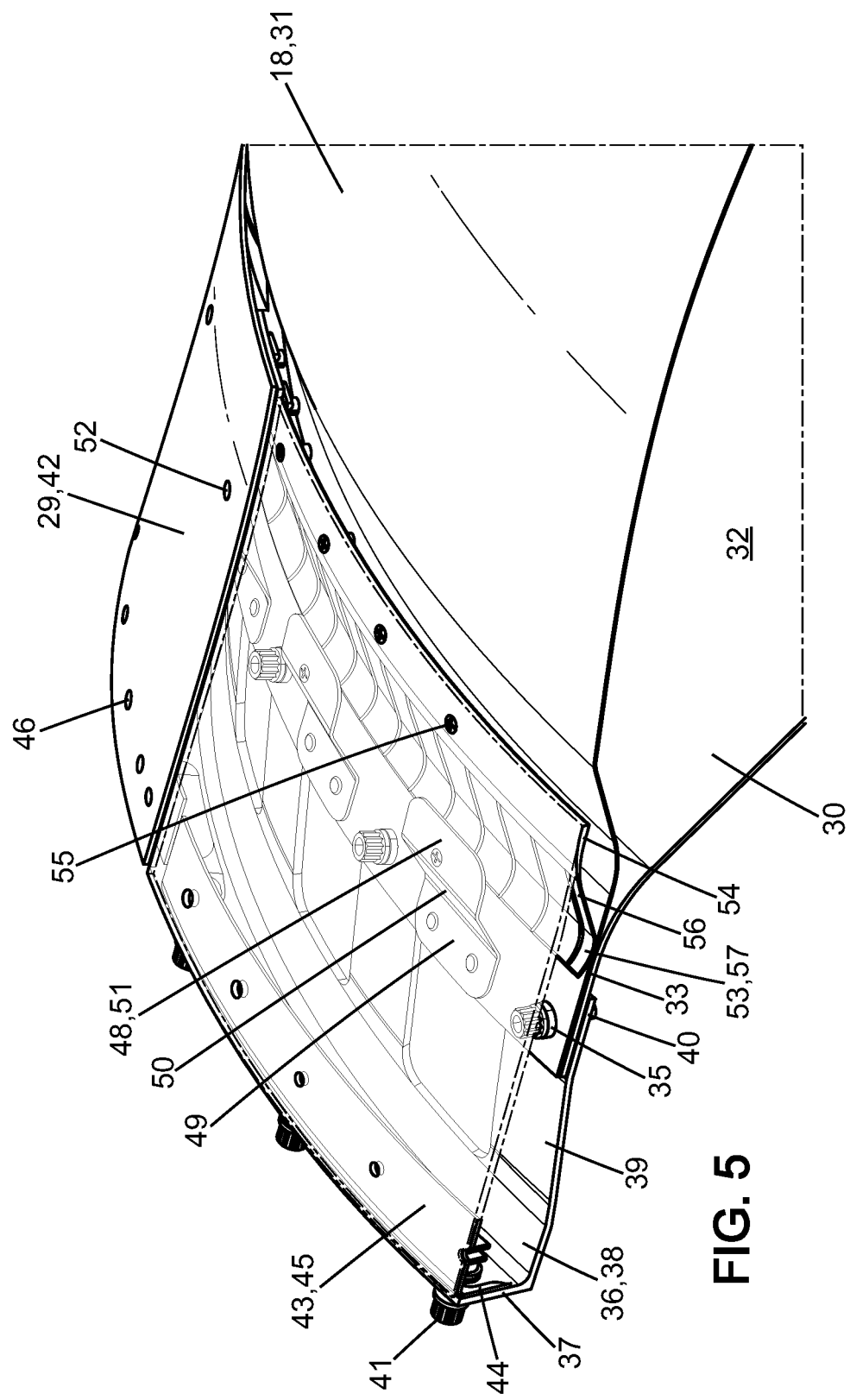
FIG. 5 is a perspective and axial sectional view of a portion of an assembly according to an embodiment of the invention.
Figure 6:
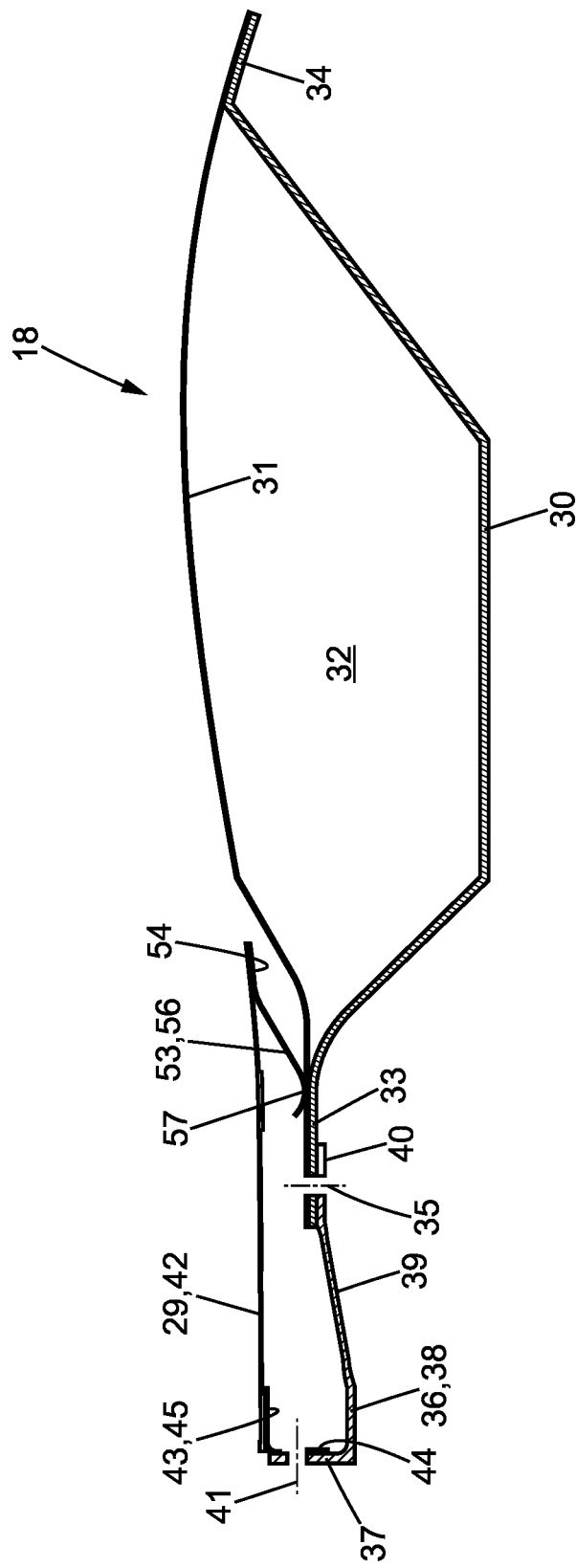
FIG. 6 is a sectional view of a portion of said assembly.
Figure 7:
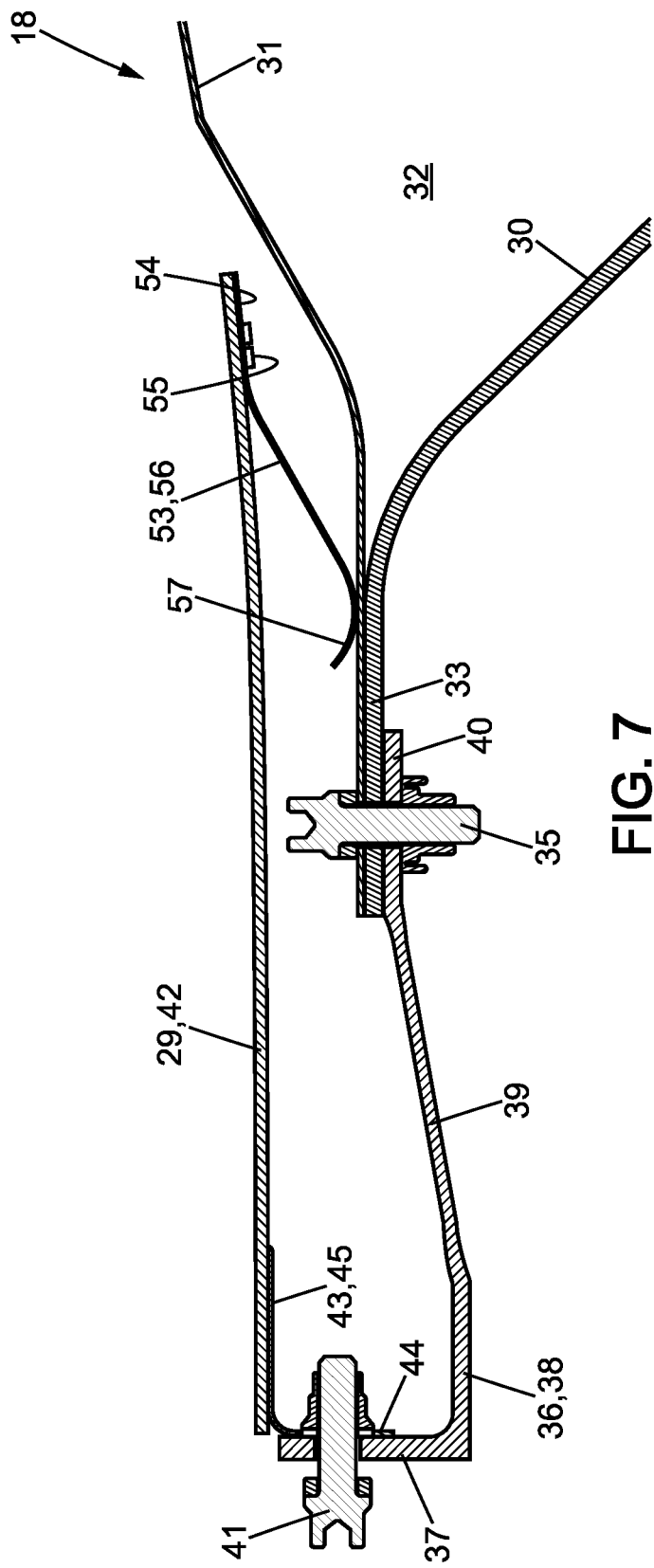
FIG. 7 is a detailed view of FIG. 6, the fastening means being shown.

FIGS. 5 to 11 illustrate an exhaust assembly for an aircraft turbomachine 1 according to an embodiment of the invention. This assembly includes an exhaust case 17 (not shown in these figures) including, as above, a radially inner annular shell 19 and a radially outer annular shell 20, connected by radial blades.

The assembly further includes an exhaust cone 18 including a radially inner skin 30 and a radially outer skin 31, defining an acoustic chamber 32 between them. A cellular material, for example honeycombed, can be housed in the acoustic chamber 32. This material can be brazed, bonded or co-injected with either of the inner 30 or outer 31 skins, for example. The inner 30 and outer 31 skins are fastened to one another at the upstream 33 and downstream 34 ends thereof, by bonding, brazing or via fastening means such as rivets or bolts 35.

An annular flange 36, optionally segmented, connects the downstream end of the inner shell 19 of the exhaust case 17 and the upstream end 33 of the exhaust cone 18.

The flange 36 includes, from upstream to downstream, a radial annular fastening portion 37, an axial annular portion 38, connecting lugs 39 and an axial annular fastening portion 40, which can be annular or formed by the ends of the lugs 39.

The portion 37 is fastened to the inner shell 19 of the exhaust case 17, for example via bolts 41. The portion 40 is fastened to the upstream ends of the skins of the cone, for example via bolts 35.

An annular and segmented fairing 29 (FIG. 8) surrounds the lugs 39 and the upstream ends 33 of the inner 30 and outer 31 skins. The fairing 29 extends in the projection of the outer surface of the inner shell 19 of the exhaust case 17 and in the projection of the outer skin 31, so as to ensure a surface continuity of the primary path 8 in this zone.

The fairing 29 thus consists of several segments 42, for example 4 segments, regularly distributed along the circumference and arranged end to end. The upstream end of each segment 42 is fastened to the portion 37 of the flange 36, via an L-shaped cross-section annular rail 43. Said rail 43 includes a radial portion 44 fastened to the radial portion 37 of the flange 36 via at least a portion of the fastening means 41 or via separate fastening means, and an axial portion 45 fastened to the upstream end of each segment 42, via fastening means, in particular removable, for example bolts 46. As seen in FIG. 9, the circumferential ends of the adjacent segments 42 overlap at overlap zones 42a and are fastened in relation to each other at these overlap zones 42a, via removable fastening means 47.

Support members 48 regularly distributed along the circumference extend radially between the upstream end 33 of the outer skin 31 and a downstream zone of the fairing 29. Each support member 48 includes a radially inner upstream portion 49 fastened by any suitable means, for example by riveting, to the upstream ends 33 of the inner and/or outer skins 30, 31, an oblique median portion 50 forming an angle with the axial direction and the radial direction, and a radially outer downstream portion 51 fastened by any suitable means to the segments of the fairing 29, preferably via removable fastening means such as bolts 52.

An annular seal 53 is mounted radially inside the fairing 29. Said seal 53 can be optionally segmented and includes a radially outer downstream portion 54, fastened by any suitable means 55, to the downstream end of the fairing 29, an oblique median portion 56 and a rounded radially inner portion 57 held elastically pressing on the upstream end 33 of the outer skin 31. The median portion 56 consists of adjacent fingers, the fingers being elastically deformable individually in relation to each other.

The pressing of the inner portion 57 of the seal 53 on the outer skin 31 is for example a linear pressing, due to the rounded shape of said inner portion 57.

In this embodiment, the median portion 56 is frustoconical and is inclined from upstream to downstream and radially from the inside outward.

The seal 53 makes it possible to limit or prevent the introduction of hot gases from the turbine 7 in the volume located radially inside the fairing 29.

Such an embodiment can particularly be used when the pressure in the volume located radially inside the fairing 29 is greater than the pressure of the gases at the primary path 8, so as to keep the inner end of the seal 53 pressing on the outer skin 31, due to the difference in pressure.

Figure 10:
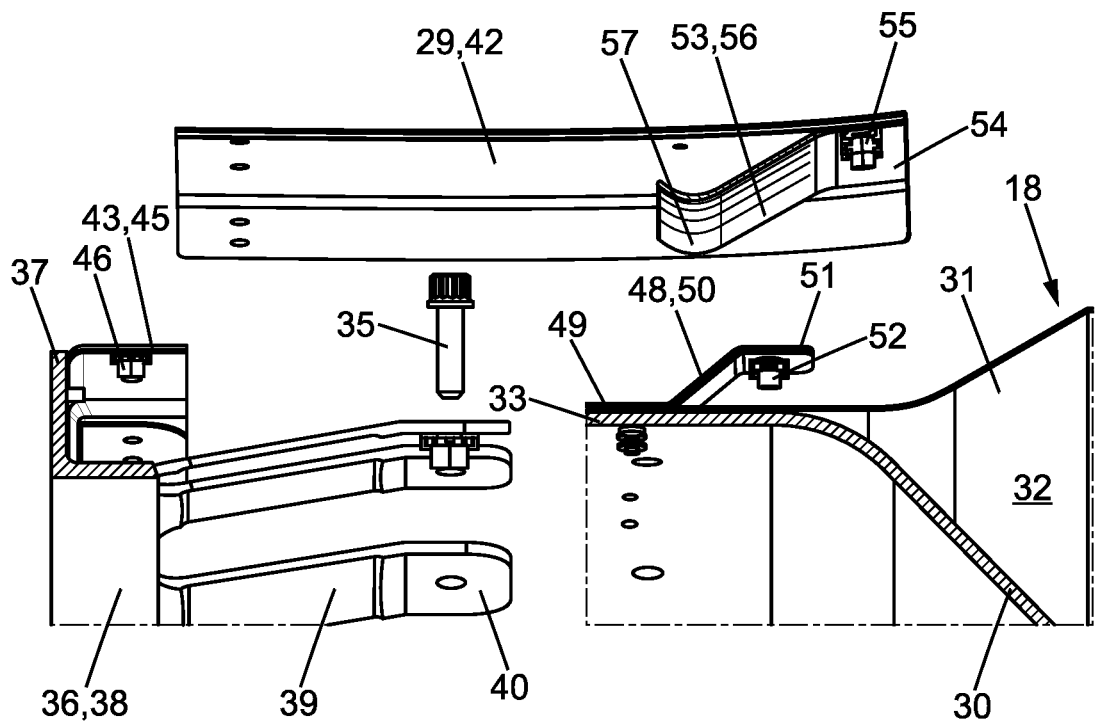
FIG. 10 is an exploded, perspective and axial sectional view of a portion of the assembly.
Figure 11:
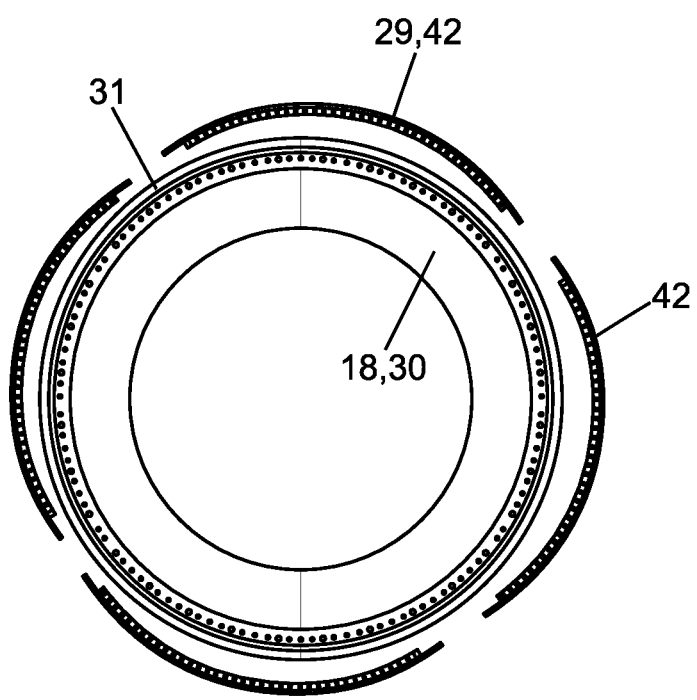
FIG. 11 is a partially exploded front view, illustrating the different segments of the fairing around the rest of the assembly.

FIGS. 10 and 11 illustrate the method for mounting such an assembly. Such a method includes the successive steps consisting of:
  mounting the annular connecting rail 43 and/or the flange 36 onto the exhaust case 17,
  mounting the subassembly formed by the inner skin 30, the outer skin 31 and the acoustic material contained in the acoustic chamber 32, on the flexible flange 36,
  mounting the angular segments 42 of the fairing 29.

Figure 12:
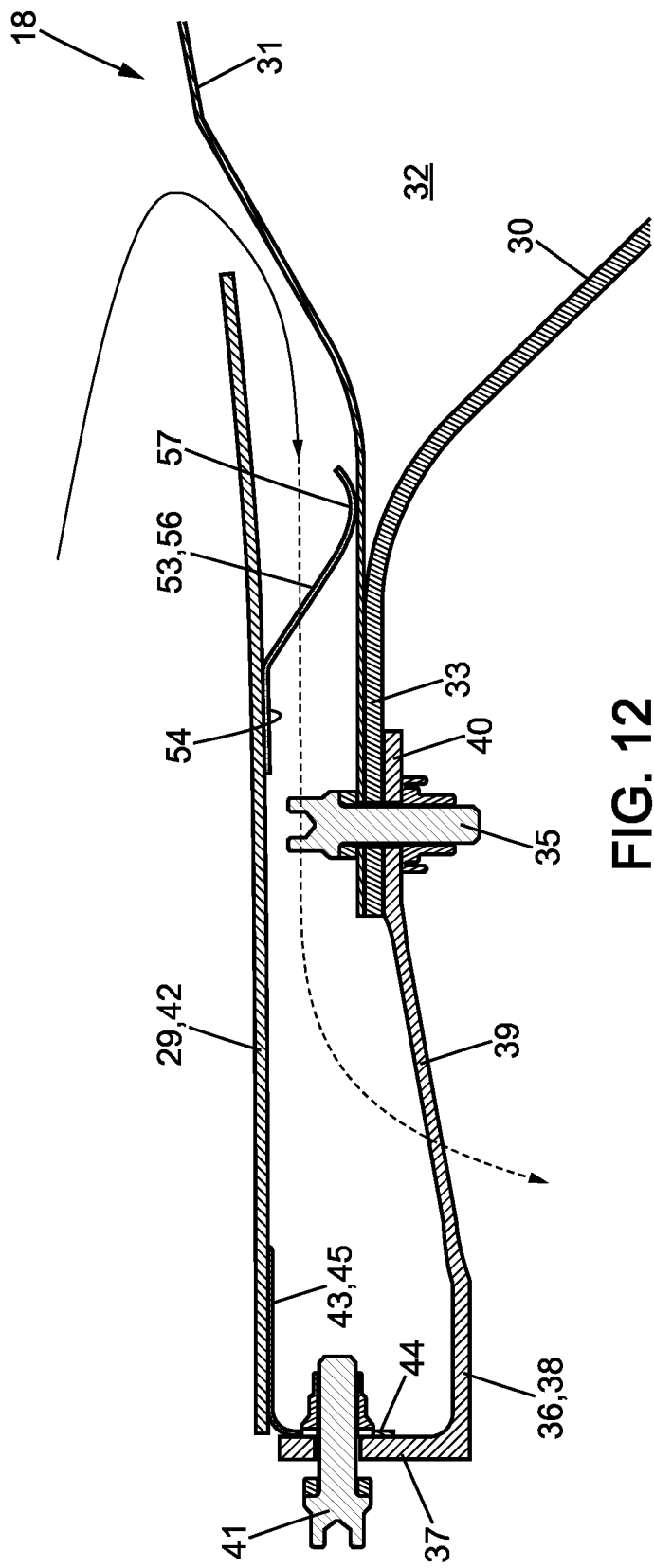
FIG. 12 is a view corresponding to FIG. 7, illustrating another embodiment of the invention.

FIG. 12 illustrates a further embodiment of the invention, which differs from that described above with reference to FIGS. 5 to 11 in that the median portion 56 extends from the upstream to the downstream and radially from the outside inward.

Such an embodiment can particularly be used when the pressure in the volume located radially inside the fairing 29 is less than the pressure of the gases at the primary path 8, so as to keep the inner end 57 of the seal 53 pressing on the outer skin 31, due to the difference in pressure.

Figure 13:
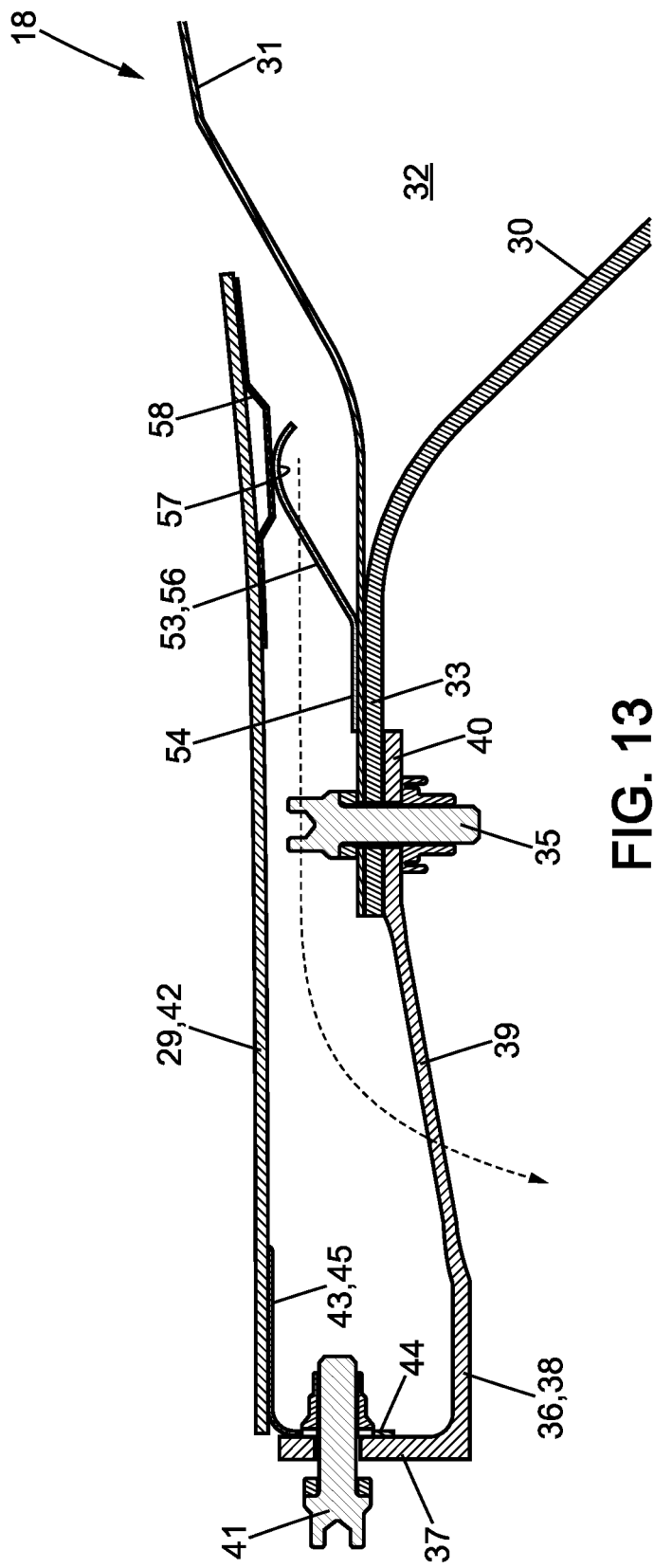
FIG. 13 is a view corresponding to FIG. 7, illustrating another embodiment of the invention.

FIG. 13 illustrates a further embodiment, which differs from those illustrated with reference to FIGS. 5 to 12 in that the portion 54 is located upstream and radially inside and is fastened to the outer skin 31, the portion 57 being located downstream and radially outside and presses on a pressing element 58 fastened to the fairing 29. In this embodiment also, the median portion 56 is inclined from upstream to downstream and radially from the inside outward.

Figure 14:
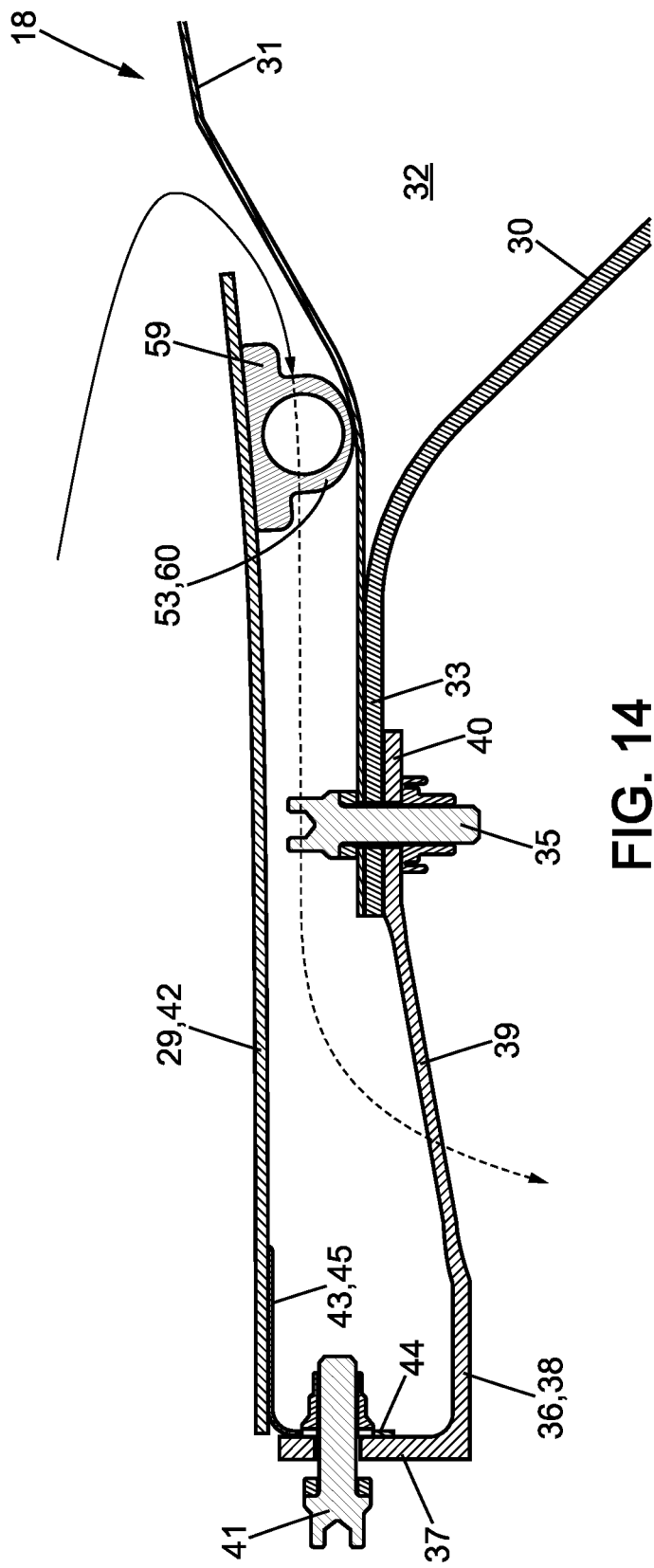
FIG. 14 is a view corresponding to FIG. 7, illustrating another embodiment of the invention.

FIG. 14 illustrates a further embodiment wherein the annular seal 53 includes a radially outer base 59 fastened to the fairing 29 and a portion 60 of hollow circular cross-section, elastically deformable in the radial direction and pressing on the outer skin 31. As above, the seal 53 can be segmented.

Figure 15:
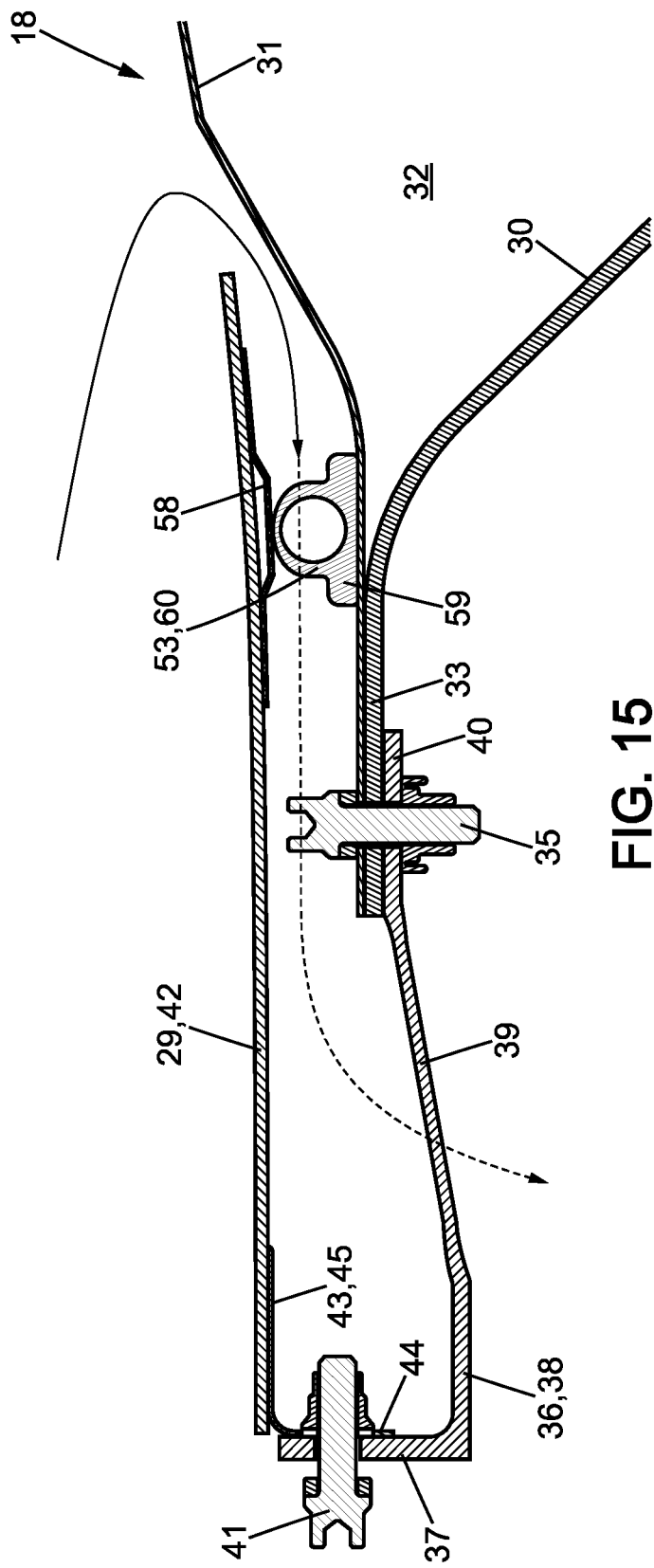
FIG. 15 is a view corresponding to FIG. 7, illustrating another embodiment of the invention.

FIG. 15 illustrates a further embodiment of the invention, which differs from that illustrated in FIG. 14 in that the base 59 is radially inner and is fastened to the outer skin 31, the portion of circular cross-section 60 pressing on a pressing element 58 fastened to the fairing 29.

Figure 16:
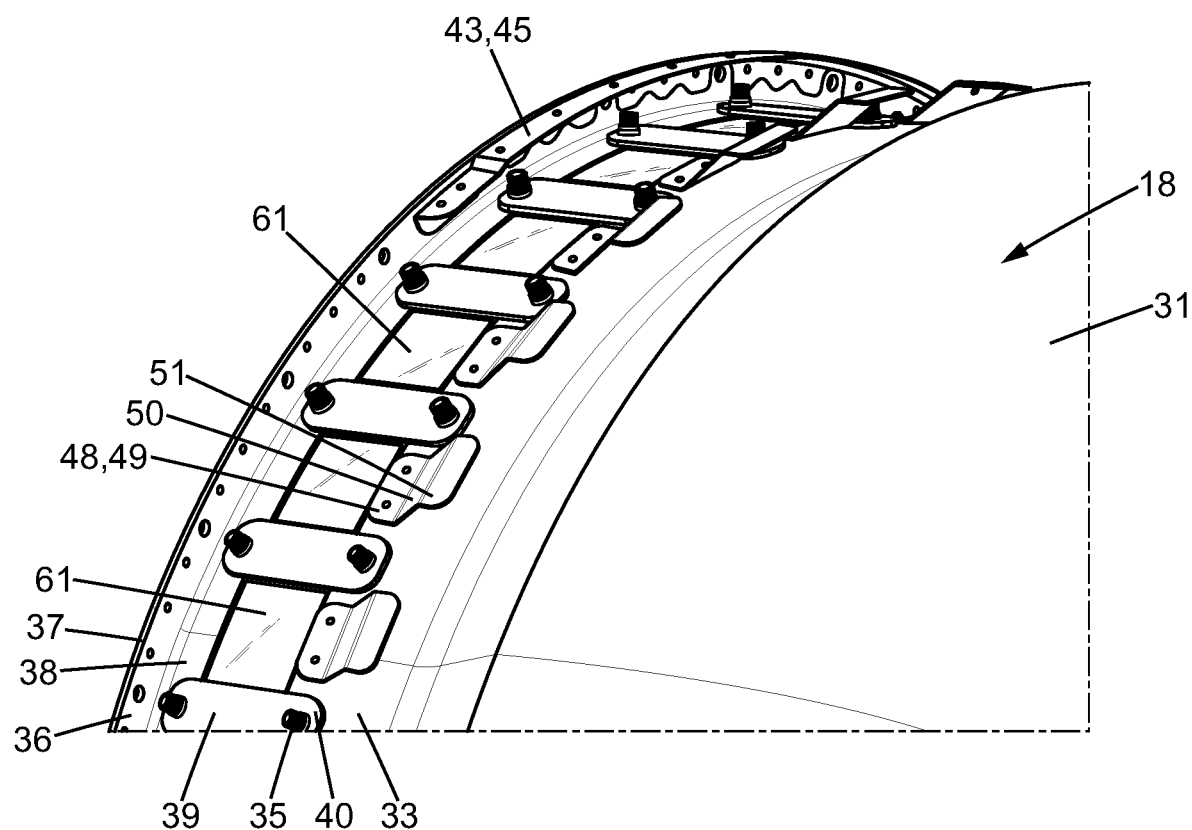
FIG. 16 is a perspective view of a portion of an assembly according to the invention, the fairing having been removed.

FIG. 16 illustrates a further embodiment wherein sealing members 61 are mounted circumferentially between the lugs 39. Said members 61 can be formed by sheets or foils mounted between the lugs 39. These members 61 make it possible to limit hot gas leak flows from the primary path 8. The lugs 39 can be made of separate parts from the flange 36, the upstream ends of the lugs 39 then being fastened to the axial portion 38 of the flange 36.

The invention claimed is:

1. An assembly for a turbomachine (1) comprising:
    an exhaust cone (18) and an exhaust case (17) including an annular inner shell (19), the exhaust cone (18) and the exhaust case (17) extending about an axis (X),
    the exhaust cone (18) including a radially outer skin (31) extending in the projection of said inner shell (19) and a radially inner skin (30) defining a chamber (32) with the outer skin (31), an upstream end (33) of the cone (18) being fastened to the inner shell (19) via connecting lugs (39),
    the assembly including an annular fairing (29) located radially outside said lugs (39) and extending axially between the inner shell (19) of the exhaust case (17) and the outer skin (31) of the exhaust cone (18), said fairing (29) extending in the projection of said inner shell (19) and of the outer skin (31),
    wherein the fairing (29) is segmented and comprises several angular segments (42) arranged circumferentially end to end.

2. The assembly according to claim 1, wherein the fairing (29) includes an upstream end fastened to the inner shell (19) of the exhaust case (17) or to a flange (36) fastened to said inner shell (17), and an opposite downstream zone supported by a support member (48), said support member (48) extending radially between said downstream zone of the fairing (29) and the cone (18).

3. The assembly according to claim 2, wherein the assembly includes an annular seal (53) extending radially between the downstream zone of the fairing (29) and the cone (18).

4. The assembly according to claim 3, wherein the annular seal (53) includes a fastening portion (54) to the fairing (29) or to the cone (18), and a median portion (56) in sheet form, extending obliquely in relation to a radial direction.

5. The assembly according to claim 4, wherein said median portion (56) extends from downstream to upstream and radially from the outside inward.

6. The assembly according to claim 4, wherein said median portion (56) extends from upstream to downstream and radially from the outside inward.

7. The assembly according to claim 3, wherein the annular seal (53) includes a zone of hollow rounded cross-section (60).

8. The assembly according to claim 1, wherein circumferential ends of two adjacent fairing angular segments (42) overlap circumferentially (42a).

9. The assembly according to claim 1, wherein the adjacent angular segments (42) are fastened to one another or to the inner shell (19) of the exhaust case (17) via removable fastening means (46, 47).

10. A turbomachine (1) including at least one assembly according to claim 1.

11. The assembly of claim 3, wherein the annular seal (53) is segmented and circumferential ends of two adjacent fairing segments (42) overlap circumferentially (42a).

12. The assembly according to claim 3, wherein the adjacent angular segments (42) are fastened to one another or to the inner shell (19) of the exhaust case (17) via removable fastening means (46, 47).

* * * * *